United States Patent [19]
Kucmerowski et al.

[11] Patent Number: 5,991,383
[45] Date of Patent: Nov. 23, 1999

[54] PARTITIONING OF DISPLAY FOR CALLING PARTY NUMBERS

[75] Inventors: Dennis L. Kucmerowski, Delray Beach; David A. Vander Meiden; Harald Muller, both of Boca Raton, all of Fla.

[73] Assignee: Siemens Information and Communication Networks, Inc., Boca Raton, Fla.

[21] Appl. No.: 09/085,365

[22] Filed: May 26, 1998

[51] Int. Cl.⁶ .................................................. H04M 1/56
[52] U.S. Cl. .................... 379/142; 379/88.19; 379/88.21
[58] Field of Search .................... 379/88.19, 88.2–88.21, 379/93.23, 120, 127, 142, 354

[56] References Cited

U.S. PATENT DOCUMENTS

| | | | |
|---|---|---|---|
| 5,442,686 | 8/1995 | Wada et al. ................................. | 379/88 |
| 5,506,894 | 4/1996 | Billings et al. ........................... | 379/127 |
| 5,524,140 | 6/1996 | Klausner et al. .......................... | 379/67 |
| 5,546,447 | 8/1996 | Skarbo et al. ............................ | 379/142 |
| 5,590,184 | 12/1996 | London .................................... | 379/142 |
| 5,602,908 | 2/1997 | Fan ......................................... | 379/199 |
| 5,883,942 | 3/1999 | Lim et al. ................................ | 379/142 |

*Primary Examiner*—Curtis A. Kuntz
*Assistant Examiner*—Duc Nguyen

[57] ABSTRACT

A system and method for communication information between origination equipment and destination equipment, in which switching signal information is received from a calling party telephone network. Additionally, information is also received from origination equipment for use by destination equipment for displaying calling party numbers. A display for use with the destination equipment receives the information from the calling party telephone network. From the plurality of information received, a first code from the calling party telephone network identifies calling party number information, and a second code from the calling party telephone network identifies partitioning information of the first code relating to a convention of parsing of telephone numbers associated with the calling party telephone network. The parsing of the calling party numbers into fields introduces field separator characters between the fields including delimiters such as dashes, spaces, parenthetical, graphical characters and the like to separate destination codes from subscriber numbers according to international, country, national or regional fields, such as the North American Numbering Plan.

19 Claims, 4 Drawing Sheets

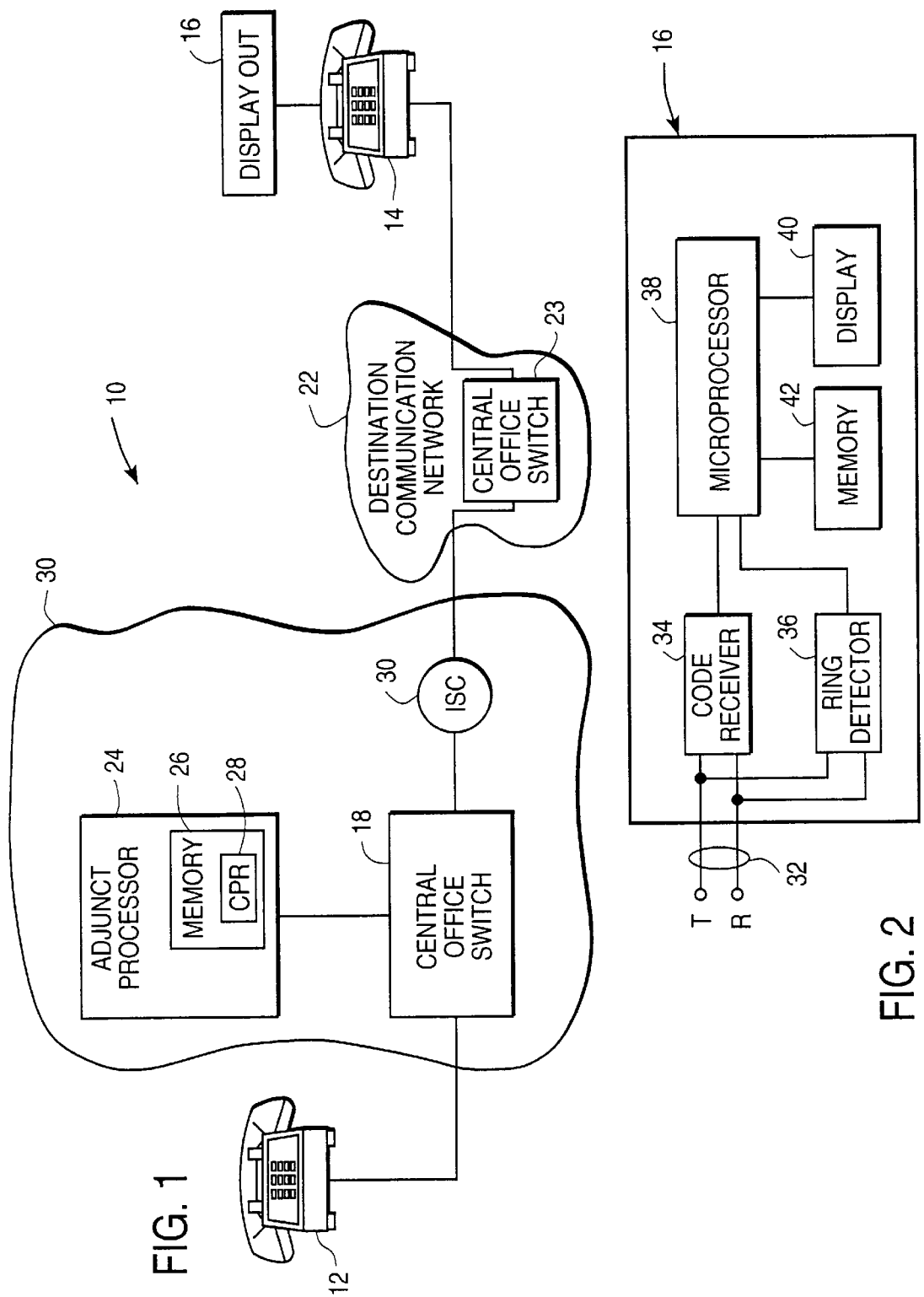

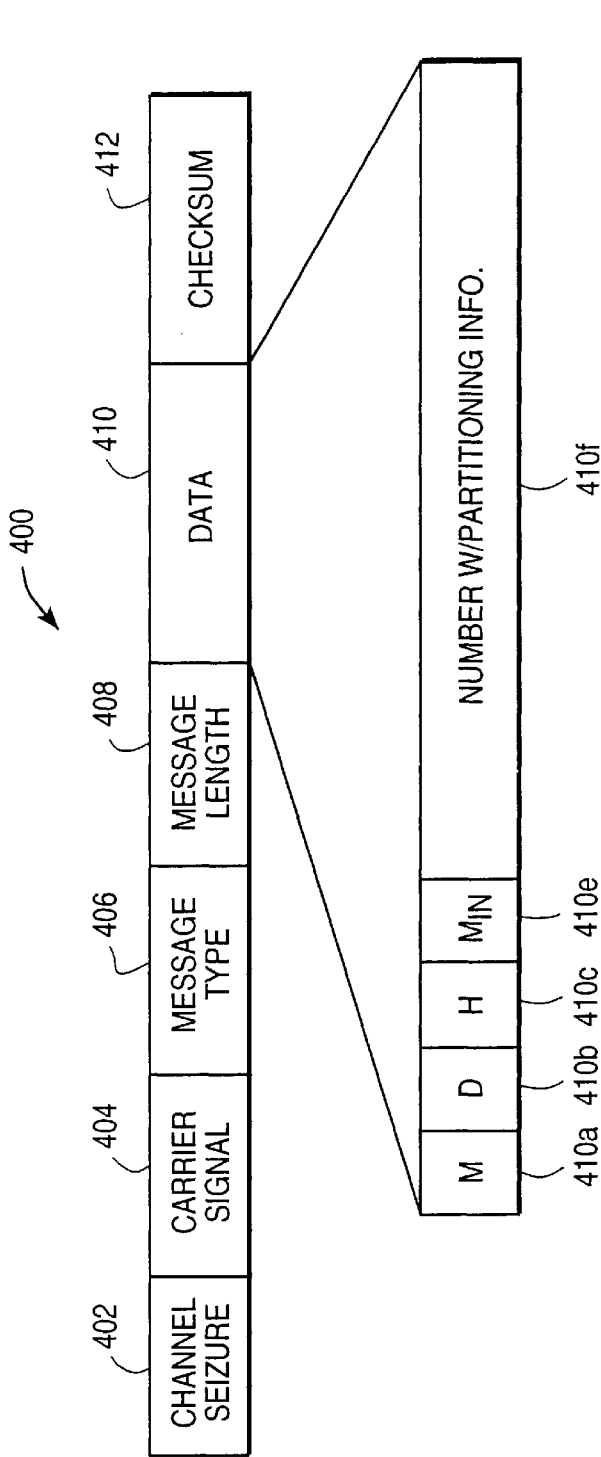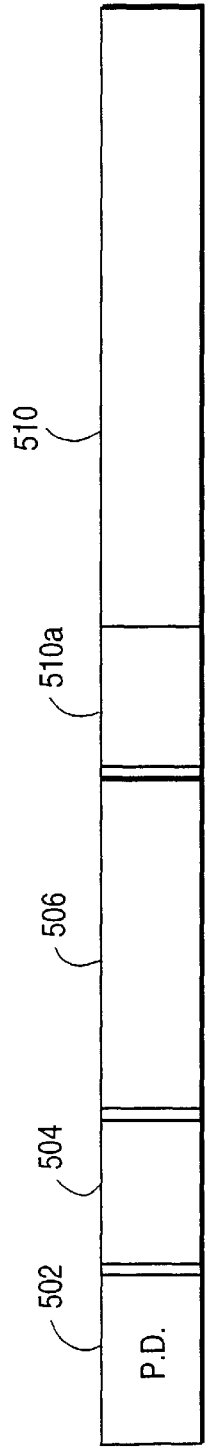
FIG. 4
FIG. 5

PARTITIONING OF DISPLAY FOR CALLING PARTY NUMBERS

BACKGROUND OF THE INVENTION

1. Field of the Invention

The present invention relates to calling party number display systems and, more particularly, to a calling party number display system in which information is communicated between the origination equipment and destination equipment for parsing of telephone numbers to be displayed to increase the readability of international numbers and calls from different area codes.

2. Description of the Related Art

Presently, calling party number delivery systems, also known as caller-ID systems, typically only provide an unparsed telephone number of the calling party sent via the originating switching equipment and transported through the telecommunications network to the terminating switching equipment for display at the telephone receiver's device. Partitioning information is not sent through the network. Some terminating switching equipment attempts to provide partitioning of the calling party number using a best guess algorithm for partitioning the received calling party number digits. However, these algorithms often fail to provide the correct partitioning for all calls.

Known algorithms that can provide correct partitioning on a high percentage of calls are generally complicated and require the maintenance of an ever-changing database of numbering plan information, especially for international numbers. Thus, it would be desirable to take advantage of the switching equipment providing the calling party number which is best suited for determining the proper partitioning since it "knows" the numbering plan of the originating user.

Partitioning of displayed information for calling party numbers is a feature that may be used in the telecommunications field. To this end, it would be further desirable to apply such partitioning to a public (National or International) or private network telecommunication systems to improve readability of the calling party number displayed at the telephony users device by partitioning the number into logical fields separated by the field separators commonly used at the location of the display. Such partitioning may be especially helpful for use with international numbers which are of a more flexible format and often more difficult to read without the partitioning. Therefore, it would be advantageous to provide calling party number delivery systems in which information between origination equipment and destination equipment is communicated so as to identify a convention of parsing of telephone numbers associated with the calling party telephone network.

SUMMARY OF THE INVENTION

According to one embodiment of the invention, parsing information is communicated between origination equipment and destination equipment. Switching signal information is received from a calling party telephone network, as well as additional information from the origination equipment for use in displaying calling party numbers with a display at the destination equipment which receives the information from the calling party telephone network. The calling party telephone network thus receives switching signals from the origination equipment and the destination network also receives information from the calling party telephone network for use by the destination equipment. A receiver is provided for receiving a plurality of codes or ISDN protocol from the calling party telephone network identifying calling party number information and partitioning information of the calling party number. Parsing of the calling party numbers into fields introduces field separator characters such as spaces, dashes and parentheses inserted between the fields to separate destination codes representing the telephone numbers for subscriber as various fields according to the convention of the calling party telephone network.

Briefly summarized, the present invention relates to systems and methods for communicating information between origination equipment and destination equipment, in which switching signals are received from the origination equipment via a calling party telephone network. Further information is received from the calling party telephone network for use by the destination equipment for displaying calling party numbers corresponding to the origination equipment. A display for use with the destination equipment is coupled to the destination network for receiving the information from the calling party telephone network. A first code from the calling party telephone network identifies calling party number information, and a second code from the calling party telephone network identifies partitioning information of the first code relating to a convention of parsing of telephone numbers associated with the calling party telephone network.

These and other objects and advantages are realized by partitioning calling party numbers using information communicated to identify a convention of parsing of the telephone numbers associated with the calling party telephone network.

BRIEF DESCRIPTION OF THE DRAWINGS

A better understanding of the present invention can be obtained when the following detailed description is considered in conjunction with the following drawings in which:

FIG. 1 is a block diagram illustrating a communication system between origination equipment and destination equipment identifying a convention of parsing of telephone numbers associated with the calling party telephone network;

FIG. 2 shows a block diagram of the display unit of FIG. 1 responsive to plural codes from the calling party telephone network for displaying calling party numbers corresponding to the origination equipment;

FIG. 4 is a diagram illustrating an exemplary caller-ID data message according to an embodiment of the invention;

FIG. 5 is a diagram illustrating an exemplary set-up message including partitioning information for caller-ID according to an embodiment of the present invention.

DETAILED DESCRIPTION OF THE INVENTION

Figure 3:
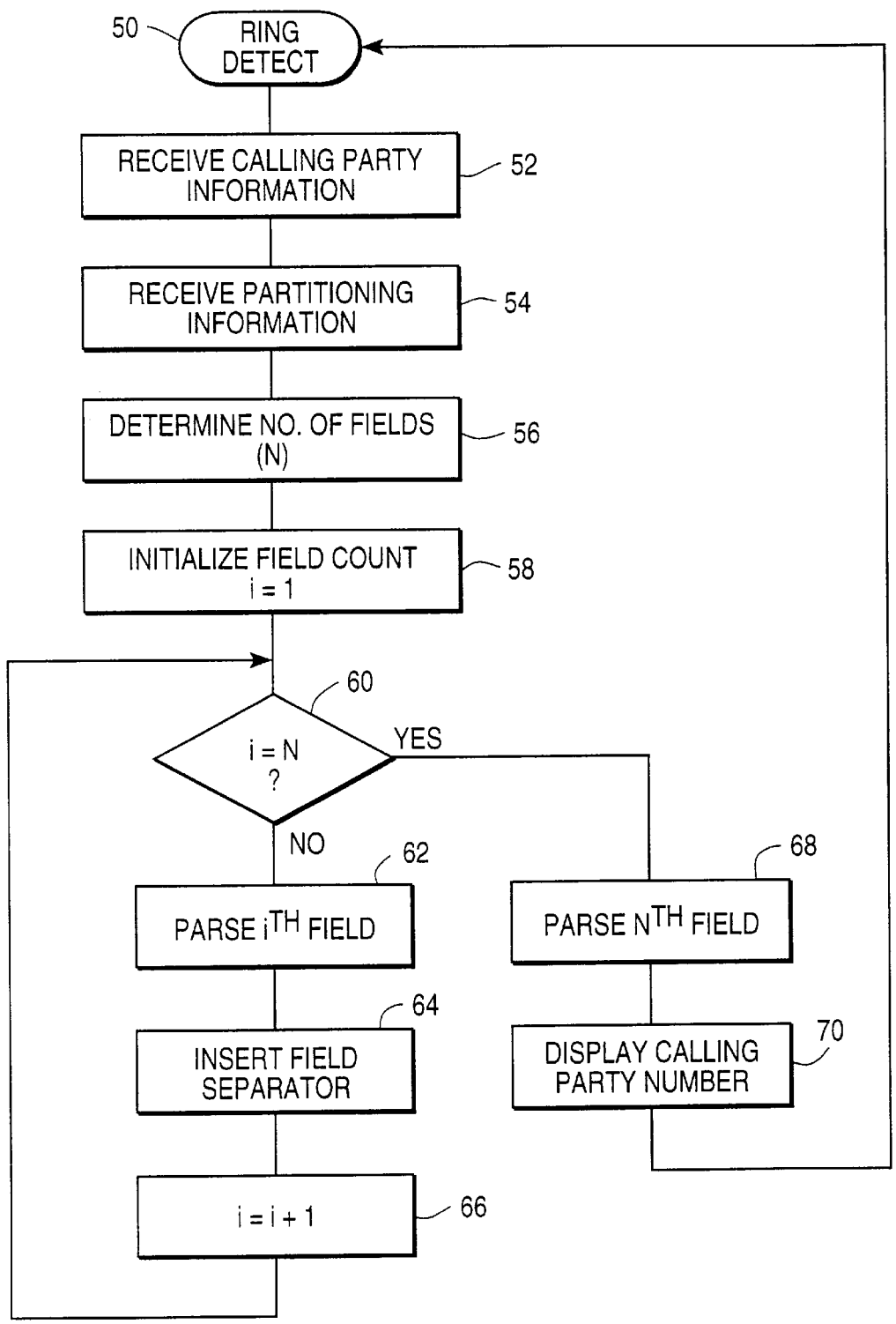
FIG. 3 is a program flowchart for software used with the microprocessor of the display unit in accordance with the present invention.

Turning now to the drawings and especially to FIG. 1, a diagram of one embodiment for a system 10 for communicating information between origination equipment, i.e., telephone 12 and destination equipment, i.e., telephone 14, is shown. As discussed further below, a display unit 16 is provided as being responsive to a plurality of codes from a calling party telephone network 20 for displaying the calling party number of, e.g., the telephone 12.

A central office switch 18 stores in its memory a routing table that correlates a port number and a line identification number to a telephone number. When call set-up information for an outgoing call is received by the central office switch 18 via a particular line and through a particular port, the central office switch 18 uses its routing table to identify the calling party number associated with that call. Similarly, the routing table may allow the central office switch 18 to identify a particular port and a particular line by mapping the called party number to the port and line identification numbers in the routing table.

Also connected to the central office switch 18 may be an adjunct processor 24; a general purpose computer that executes instructions stored in a memory 26. Those instructions include the telephone number generating software and the call processing instructions. The adjunct processor 24 of FIG. 1 includes a computer system with disk storage which receives routing data from the signalling network associated with the central office switch 18. The adjunct processor 24 provides a database management system for retrieving and processing call handling instructions for a specific subscriber based on a set of parameters, which may include the routing table, known as the Call Processing Record, CPR 28.

In FIG. 1, a station set telephone 12 located at the originating site, for example, an originating country, is shown connected to the calling party telephone network 20 of that country. A network 20 is served by International Switching Center (ISC) 30 which is a point of egress for outbound international calls from the originating country. The International Switching Center 30 couples to a network in a destination country, e.g., destination communication network 22 serving station set telephone 14, performs two primary functions. Namely, it operates as the point of entry for international traffic to be switched on inter-exchange carrier network and it served as the access point to the Common Channel Signalling network for international calls. The destination network 22 may thus include one or more central office switches or PBXs 23. The Common Channel Signalling network is a packet switching network used to exchange call handling messages between processor-driven switching systems according to a specific protocol such as CCS7 or CCS7 ISUP. The signalling network is composed of a plurality of interconnected nodes. It is noted that, while illustrated as international networks, the invention is equally adapted for purely domestic calls in a public telephone network and calls in a private telephone network. Thus, FIG. 1 is exemplary only.

The display unit 16 shown in block diagram form in FIG. 2 is connected in parallel with a pair of external telephone line, tip/ring pair 32, and, e.g., telephone 14 (or any other telecommunication device, such as a fax machine, an e-mail or the like) for picking up the identification information of a calling party transmitted by the telephone lines 32. The additional presence of the identifying apparatus does not affect the standard function of the telephone 14. The display unit 16 includes a microprocessor 38, a display apparatus, e.g., LCD display 40, memory 42, a ringing detector 36 and a code receiver 34. The memory 42 may be a programmable memory, such as an EEPROM. The code receiver 34 and the ringing detector 36 have their input terminals respectively connected to the external telephone lines 32 in parallel for detecting the transmitted signal from the lines 32 and further forward the detected signal to the microprocessor 38. It is noted that the display unit 16 may also be integrated with the telephone 14. Further, the invention is applicable to both analog caller ID units and digital telephones with caller ID, such as ISDN telephones. Thus, FIG. 2 is exemplary only.

The code receiver 34 is electrically connected between the external lines 32 and the microprocessor 38 for receiving the calling party information, converting the information to digital signals and feeding the digital signals to the microprocessor 38. The display 40 is electrically connected to the microprocessor 38 for illustrating the related information such as the telephone number and the name of the calling party and the like as will be described in greater detail.

Partitioning of the display for calling party numbers when applied to a public (National or International) or private network telecommunication system improves the readability of the calling party number displayed at the call receiver's display device by partitioning the number into logical fields separated by a field separator commonly used at the location of the display. This is especially helpful for international numbers which are of a more flexible format and therefore more difficult to read without the partitioning. For example, an international number display for Jakarta, Indonesia, may appear as being a non-partitioned number, e.g., "62215272336," which should actually appear as a corresponding partitioned number, e.g., "62-21-527-2336," according to the local convention in Indonesia.

Partitioning of the display for calling party numbers thus provides the telephone user with improved readability of calling party number information. For the North American Numbering Plan (NANP) number, a first Calling party information code may be provided as, "9547714558," and an additional second partitioning information code that could be provided as "3 3 4" which may be used to generate corresponding display information, i.e., "954-771-4558." An international example may be provided as: Calling party information "62215272336," and Partitioning information "2 2 3 4" resulting in Display Information: "62-21-527-2336." The last number of partitioning information may alternatively be provided as a "wildcard" which could indicate that the display should group all remaining digits in the calling party number, e.g., "*" indicating a group all remaining digits, such that: Calling party information "62215272336"; Partitioning information would be "2 2 3*" with the Display Information resulting in "62-21-527-2336."

Another variation of partitioning is: When displaying calling party information using the partitioning information, the remaining digits in the calling party number, which were not specifically indicated to group, shall be displayed as the last group of digits. For example: Group all remaining digits, such that where: The Calling party information is "62215272336," and the Partitioning information is "2 2 3," the resulting Display information may be presented as "62-21-527-2336."

The switching equipment providing the calling party number is best suited for determining the proper partitioning since it "knows" the numbering plan of the originating user. This involves adding additional signalling information to the calling party number information (i.e., partitioning information) that is provided by the originating switching equipment and transported through the telecommunications network to the terminating switching equipment. This additional signalling information indicates where the partitioning for the calling party number should be placed. Upon receipt of the partition information along with the calling party number digits, the terminating switching equipment can easily and accurately display a properly partitioned calling party number for all calls, regardless of their point of origin. The proposed scheme allows the terminating switch to use the field separators preferred by the called party such as dashes, space characters, parentheses, hearts, crosses, etc.

Turning now to FIG. 5, a diagram illustrating an exemplary information field 500 used to transport the parsing information from the originating switching equipment 20 (FIG. 1) to the destination switching equipment 23, is illustrated. The data field 500 is representative of, for example, an ISDN information field. As is well known, the ISDN information field 500 is a variable length field that contains the Q.931 protocol data used for the establishment, maintenance and termination of network connections between two devices. The information field 500 includes a protocol discriminator field 502 that identifies the layer three protocol, such as Q.931 user-network call control. A call reference field 504 is provided to uniquely identify each call on the user network interface. A message type field 506 is provided to identify the message type such as SETUP, ALERT, CONNECT and the like. The message type determines what additional information will follow. Finally, a variable length information element field 510 is provided. According to the present invention, when the message type field 506 indicates a SETUP message, a parsing subfield 510a is provided in association with the calling party number information contained within the information field 510. The parsing subfield 510a identifies parsing information provided by the originating switch 18.

Figure 6:
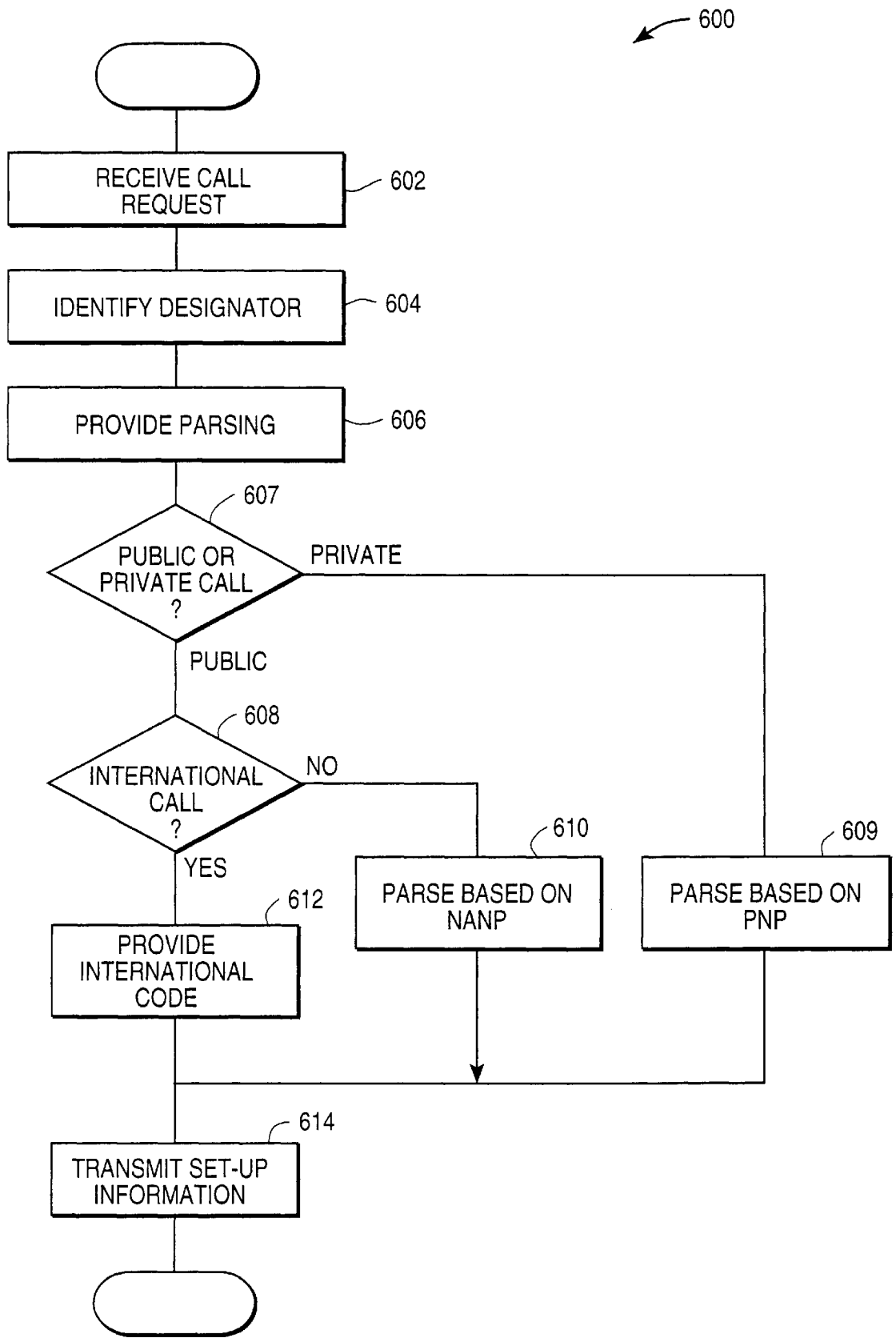
FIG. 6 is a flowchart illustrating partitioning information set-up according to the present invention.

Turning now to FIG. 6, a flowchart 600 illustrating an exemplary embodiment of the present invention for packing a partitioning field is shown. In particular, in a step 602 the originating switch 18 (FIG. 1) and adjunct processor 24 receive a call request from a telephone. Part of the call request, of course, is the outgoing telephone number which is used in a step 604 to identify the destination of the call. The adjunct processor 24 accesses the memory 26 to provide parsing of the originating number in a step 606. In a step 607, the system determines whether the call is a public or private call. If private, then the parsing will proceed based on the private numbering plan, in a step 609. Otherwise, in a step 608, the adjunct processor 24 and central office switch 18 determine whether or not the call is to an international party. If the call is not to an international party, for example, to a domestic user, then parsing will be accomplished according to the North American numbering plan in a step 610. Similarly, the parsing information used at step 610 may be taken from information stored along with the calling party telephone number, rather than being derived every time a call is placed. However, in a step 612, if the call is an International call, then the International codes such as Country code and City code, where applicable, may be provided. Finally, in a step 614 the system transmits the set-up information including the parsed information from FIG. 5.

As discussed above, parsing information may be sent by the calling network in the form of a sequence of integer numbers indicating the number of digits constituting the size of each field. Note that the integer numbers representing the parsing information may be encoded and transported through the network in a form that is most appropriate for the signalling system being used. For example, the parsing information may be encoded using IA5 (International Alphabet 5) characters, BCD (binary coded decimal) values, binary values or in-band (e.g., multi-frequency) tones. As another example, the international calling party number "15619973760" received in Germany could be followed by the following parsing information:

1 (parsing for 1-digit country code "1")

3 (parsing for 3-digit National destination code "561")

3 (parsing for regional destination code "997")

4 (parsing for subscriber number "3760")

The destination switching equipment in Germany, based on the received parsing information, could format the number in the locally customary fashion by inserting the hyphen delimiter ("-" character) behind the first, the fourth and the seventh digit. The destination switching equipment in Germany would display this number to the telephone user as follows:

"1-516-997-3760."

In another example, the national number "4084923911" would be sent by the originating switch with the parsing information:

3 (parsing for National destination code "408")

3 (parsing for Regional destination code "492")

4 (parsing for Subscriber number "3911")

The destination switching equipment in Boca Raton, Fla., based on the received parsing information, could format the number in the locally customary fashion by encapsulating the first three digits in parentheses and hyphen delimiter ("-" character) behind the sixth digit. The destination switching equipment in Boca Raton would display this number to the telephone user as follows: "(408) 492-3911."

Referring now to the program flowchart of FIG. 3, the microprocessor 38 (FIG. 2) controls the ring detector 36 to determine a ring detect signal at block 50, upon which block 52 is used to receive calling party information while receiving switching signals from the origination equipment via the calling party telephone network 20. At block 54, the microprocessor 38 receives partitioning information from the calling party telephone network 20 for use by the destination equipment, steps 52 and 54 are receiving a plurality of codes from the calling party telephone network 20 identifying calling party number information and also identifying partitioning information of the calling party telephone number. At step 56, a determination of the number of information fields, N (and characters per field), is derived from the partitioning information to determine a Number of fields of the telephone number from the calling party telephone network 20.

At step 58, a field counter is initialized. For each field, the system groups the numbers associated with that field until all of the fields have been parsed in steps 60–66. In particular, at step 60, a comparison between the count i and the number of fields, N, is made to determine whether the parsing operation is complete. If the parsing is not complete, the "ith" field is parsed as step 62. After each field is parsed, a field separator, such as a dash or parenthesis, appears in the form of characters between the fields of the calling party telephone number. After each field is parsed, the field counter "i" is incremented by one at step 66, and program flow returns to step 60 where a comparison between the field count and the number of fields "N" again is made.

If the field counter equals the number of fields N, program flow continues at block 68 at which the parsing of the "Nth" field occurs, and block 70 is provided for displaying the calling party telephone number for use with the destination equipment, e.g., telephone 14 and display unit 16, being coupled to the destination network 22 for receiving the information from the calling party telephone network 20.

The parsing information may be carried in an exemplary caller-ID data message received by the receiving party, as illustrated in FIG. 4. As is known, the data message 400 is provided during the first four seconds silent interval in the ringing cycle. The caller-ID delivery may employ a protocol using 8-bit words each bounded by start bit and a stop bit. The data message 400 includes a channel seizure signal 402 and a carrier signal 404, as are known in the art. The message-type word 406 identifies a message as referring to a caller identification data message. The message length word 408 specifies the total number of data words to follow.

The data words may be encoded in ASCII and represent or include a month field 410a, a day field 410b, an hour field 410c, a minute field 410e, and a directory number and partitioning field 410f.

It will be appreciated by those skilled in the art that modifications to the foregoing preferred embodiment may be made in various aspects. The present invention is set forth with particularity in the appended claims. It is deemed that the spirit and scope of that invention encompasses such modifications and alterations to the preferred embodiment as would be apparent to one of ordinary skill in the art and familiar with the teachings of the present application.

What is claimed is:

1. A communications system for communicating information between origination equipment and destination equipment, comprising:

means associated with said destination equipment for receiving a first code identifying calling party number information;

means for receiving a second code identifying partitioning information of the first code relating to a convention of parsing of telephone numbers associated with the calling party telephone network; and a display configured to display parsed calling party numbers corresponding to the origination equipment.

2. A system as recited in claim 1, wherein said second code receiving means provides information for separating the calling party number information into fields according to the convention of displaying telephone numbers by the origination equipment.

3. A system as recited in claim 2, wherein said second code receiving means receives parsing information sent by the calling party telephone network in the form of a sequence of integer numbers indicating the number of digits constituting the size of each field.

4. A system as recited in claim 3, comprising means for generating display information from said calling party information and said partitioning information.

5. A system as recited in claim 4, wherein the parsing information of said second code is encoded in a means for receiving switching signals from the origination equipment of the calling party telephone network.

6. A system as recited in claim 5, wherein the encoded parsing information comprises international alphabet characters, binary coded decimal values or in-band signalling such as multi-frequency tones.

7. A system as recited in claim 3, wherein the last number of partitioning information of said second code receiving means sequence of integer numbers comprises a wildcard character for the size of the last field.

8. A system as recited in claim 3, wherein the remaining digits in the calling party telephone number which were not specifically indicated in the number of the partitioning information of said second code comprise the last field.

9. A system as recited in claim 4, wherein the parsing of the calling party number information into fields by said generating means introduces field separator characters between the fields including delimiters such as dashes, spaces, parenthetical or graphical characters for displaying calling party numbers.

10. A system as recited in claim 9, wherein the parsing of the calling party number provides delimiters between fields to separate destination codes from subscriber numbers according to a regional telephone numbering convention.

11. A system as recited in claim 10, wherein the parsing of the calling party number provides delimiters between international, country, national or regional code fields.

12. A system as recited in claim 10, wherein the parsing of the calling party number provides delimiters between fields according to the North American Numbering Plan.

13. A communication switching system, comprising:

means for receiving calls from origination equipment;

means for identifying a destination for said calls; and means for providing parsing information related to a caller identification of said origination equipment to said destination.

14. A communication switching system according to claim 13, said providing means including means for coding said parsing information in the form of a sequence of integer numbers indicating a number of digits in one or more of a plurality of fields according to a convention of telephone numbers.

15. A communication switching system according to claim 14, said coding means including means for coding a wildcard character for a size of a field.

16. A caller identification receiver, comprising:

means for receiving caller-ID information;

means for receiving parsing information related to the caller-ID information; and means for displaying said caller-ID information in a partitioned format.

17. A caller identification system according to claim 16, said receiving means including means for receiving information related to a convention of parsing of telephone numbers associated with a calling party telephone network.

18. A caller identification system according to claim 17, said partitioning information including wildcard information for the size of one or more fields of said telephone numbers.

19. A caller identification system according to claim 18, said information including means for identifying the last partition when a specific size for the last partition field is not provided.

* * * * *